May 22, 1962  J. H. MARVIN  3,035,702
AQUARIUM FILTER SYSTEM
Filed Jan. 16, 1956
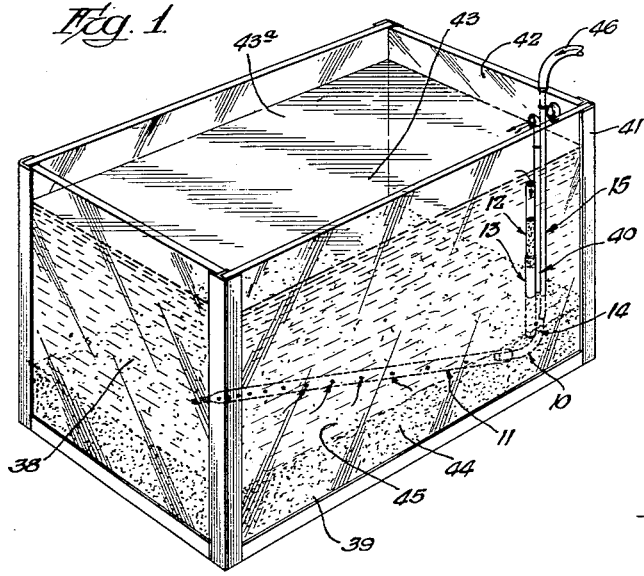
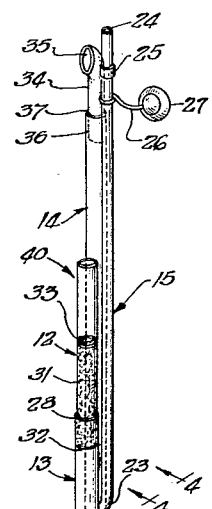
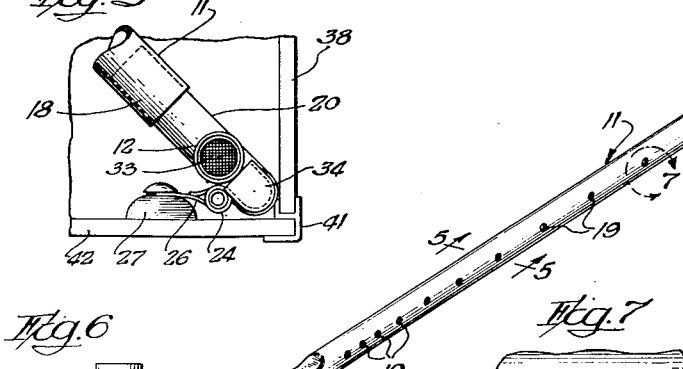
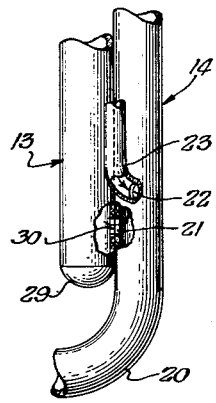
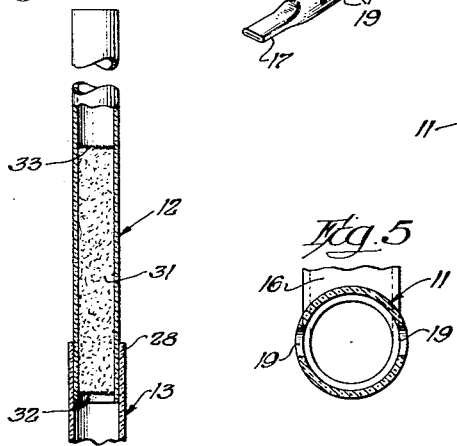
INVENTOR.
JAMES H. MARVIN
BY
Fulwider, Mattingly + Huntley
ATTORNEYS.

United States Patent Office 3,035,702
Patented May 22, 1962

3,035,702
AQUARIUM FILTER SYSTEM
James H. Marvin, 1320 Portia St., Los Angeles 26, Calif.
Filed Jan. 16, 1956, Ser. No. 559,163
9 Claims. (Cl. 210—169)

This invention relates to water filtering systems, and is particularly concerned with improvements in filtering systems for aquariums.

The prime requisite for aquatic animals in captivity is a plentiful supply of their natural element, water. Aquarium filter systems are, therefore, primarily necessary to insure the purity of the water. Secondarily, aquarium filtering systems are necessary to insure a clearness of water so desirable for exhibition purposes, and thirdly, to prevent odors emanating from the aquarium tank.

At present there are several types of filtering media which are used, among the most popular of which are sand, charcoal and glass wool. Sand, when used as a filtering medium, is placed in the aquarium bottom to a depth of several inches, and strains out the foreign matter suspended in the water originating from food particles and fish excretions as the water is drawn therethrough. The sand then acts bactericidally upon the collected organic matter, by means of aerobic bacteria contained within it. The aerobic bacteria decompose the organic matter and, in effect, destroy its objectionable properties. After the aquarium water has filtered through the sand, it is collected by a sub-sand device or underdrain and recirculated to the aquarium by means of an air pressure pump or other siphoning arrangement.

In order to achieve the most effective bactericidal and mechanical straining action of the sand filter, all the sand particles in the sand bed should come into contact with the aquarium water. The present sub-sand perforated underdrains do not permit such sand-water contact for various reasons. Generally, they are constructed so that the aquarium water is drawn vertically downward through the sand towards the uppermost perforations; thus the water contacts only those relatively few sand particles which surround the uppermost perforations in the underdrain. Further, these devices only partially utilize the sand immediately surrounding the uppermost perforations. Water, entering those perforations furthest from the point at which the siphoning line is placed has a greater pressure to overcome, due to friction inside the sub-sand device, than does the water entering those perforations nearer the siphoning line; water, taking the course of least resistance, will therefore tend to flow only towards those relatively few perforations closest the siphon arrangement, thereby contacting only a relatively small sand area. Also, present sub-sand filtering devices are not self-cleaning, that is, the devices must be periodically taken out and cleaned of sand and other foreign particles that clog the perforations of the device and thereby render it inoperative.

Accordingly, it is a major object of this invention to construct a sub-sand underdrain for aquariums designed to utilize a much greater surface area of sand in an aquarium sand bed than has been possible hitherto.

It is another object of this invention to construct a sub-sand underdrain for an aquarium which is self-cleaning.

Other types of aquarium filter systems utilize the gas absorbing properties of charcoal or the mechanical sediment retaining properties of glass wool. These filter systems generally have a filter box attached to the outside or inside wall of an aquarium tank through which the aquarium water is drawn by means of a siphoning arrangement, the filter box usually containing a large amount of charcoal and glass wool. The filter box is necessarily large and bulky relative to the size of the aquarium tank, and therefore cannot be conveniently placed out of sight. Food particles and fish excretion suspended in the water are drawn into the filter box and are retained by the glass wool section of the filtering box. Those food particles and fish excretions which have decomposed into harmful or objectionable gases are absorbed by the charcoal in the filter box. Thus, the filter box must frequently be cleaned and a fresh amount of charcoal and glass wool placed therein to adequately maintain the purity of the water.

I have found that by using my novel sub-sand underdrain in conjunction with a sediment-retaining filter media, such as glass wool, positioned above the sand layer that there is no need to use any gas-absorbing media, such as charcoal, in the filter system, and also the amount of glass wool necessary is considerably reduced and so small that the container for it may be made disposable. Further, the entire filtering system may now be placed essentially completely out of sight of the viewer of the aquarium.

Accordingly, it is an object of this invention to combine a sub-sand filtering device with an above-said filtering device inside the aquarium to thereby eliminate a gas-absorbing substance from the filtering system.

Another object of the invention is to construct an aquarium filtering system of high efficiency which is very simply made, easy to install, and which can be almost completely hidden from view.

It is a further object of the present invention to construct the above-sand filtering device of the filtering system so as to be disposable.

It is still another object of my invention to incorporate into the filtering system a disposable container for dispensing any measured quantity of medicine into the aquarium tank.

Still a further object of the present invention is to incorporate into the filtering system a means for preventing metal poisoning of the fish in the aquarium tank.

Other objects and advantages will become apparent from the following description of one embodiment of the invention, and from the accompanying drawings, in which:

FIGURE 1 is a perspective view of the filtering system of the present invention shown placed in an aquarium tank;

FIGURE 2 is an enlarged perspective view of the filtering system;

FIGURE 3 is a plan view of the above-sand filter assembly;

FIGURE 4 is a fragmentary enlarged view of FIGURE 2 taken along the line 4—4 of FIGURE 2;

FIGURE 5 is a cross-sectional view taken along the line 5—5 of FIGURE 2;

FIGURE 6 is a cross-sectional view of the above-sand filter; and

FIGURE 7 is an enlargement of one perforation of the sub-sand tube showing the position of adjacent sand particles relative thereto.

Referring now especially to FIGURES 1 and 2, the filtering system 10 of the present invention includes a sub-sand tube 11, an above-sand filter cartridge 12 placed in a tubular container 13 which opens into the side wall of an air line 14, and an air inlet tube 15 also opening into the side wall 16 of the air line.

Referring now especially to FIGURE 2, the sub-sand tube 11 is preferably a straight, cylindrical and elongated hollow tube made of a water-resistant plastic material. One end 17 of the tube 11 is preferably sealed; the other end 18 is suitably connected to the air line 14 as by an airtight telescoping connection. The tube 11 has two rows of longitudinally aligned holes 19 running along its length and spaced 180 degrees apart, as is best seen in FIGURE 5. Each hole 19 of one row is transversely aligned with a hole in the other row of the tube 11 so that a right angle is formed between the axis of each row of longitudinally aligned holes and the axis of each pair of transversely aligned holes. The spacing between the holes 19 in each row decreases linearly as the distance with respect to the open end 18 of the tube 11 increases. The exact nature and determination of this linear function will be described hereafter. The diameter of the holes is preferably approximately one-sixteenth inch or about two to three times the diameter of sand particles.

The air line 14 is an elongated cylindrical tube, made preferably of a transparent water-resistant plastic, curved at substantially a right angle at one end 20 and is of slightly smaller diameter than the sub-sand tube 11. An airtight slidable telescoping connection is thus made between the end 20 of air line 14 and the sub-sand tube 11. The advantages of such a telescoping connection lie in the fact that it allows slidable and rotatable adjustment of the sub-sand tube 11 with respect to the air line 14 and also allows convenient disassembly, assembly, and packaging of the filtering system 10.

Referring now especially to FIGURE 4, as well as FIGURE 2, the air line 14 is provided with two apertures 21 and 22 both located in the side wall of the air line near its curved end 20. Apertures 21 and 22 are preferably located at different heights and it is also preferred to position the lower aperture 21 so that the axis of the curved end 20 of the air line 14 and the center point of the lower aperture 21 lie in a substantially vertical plane when viewed along the direction of the axis of the curved end of the air line, as in FIGURE 2. The upper aperture 22 is preferably located at approximately right angles to the lower aperture 21.

Affixed to and enclosing the upper aperture 22 of the air line 14 so as to provide an airtight fit, is the lower end 23 of a small-diameter elongated air inlet tube 15. The air inlet tube 15 is slightly curved at its lower end 23 and runs preferably parallel to, and alongside of, the air line 14. The open upper end 24 of the tube 15 lies preferably above the air line 14.

A circular flange 25 surrounds the air inlet tube 15 and is affixed to it near its upper end 24. One end of a short piece of wire 26, preferably made of a stainless steel material, is affixed to a suction cup 27, the other end of the wire being loosely fitted around the air inlet tube 15 to permit the suction cup to be slidably adjustable thereon. The upward movement of the suction cup 27 is limited by the flange 25.

A straight hollow cylindrical container 13, made of transparent water-resistant plastic, is open at its upper end 28 and closed at its lower end 29. The container 13 is provided with a side wall opening 30 near the closed end 29 thereof, the side wall opening 30 being preferably of substantially the same diameter as the lower aperture 21 in the air line 14. The container 13 is affixed to the lower portion of the side wall 16 of the air line 14, preferably just above the curved end 20 thereof, so that the lower aperture 21 of the air line is aligned with the side wall opening 30 of the container 13.

Referring now especially to FIGURE 6, the cylindrical container 13 is provided with a cylindrical filter cartridge 12 which is slidably movable in the open end 28 of said container by means of a telescopic connection. The lower half of the filter cartridge 12 contains a suitable sediment-retaining filter medium, such as glass wool 31, which is held in the filter cartridge by means of spaced screens 32 and 33 affixed to one section of said filter cartridge. Another purpose of the upper screen 33 is to prevent any large particles of foreign matter from contacting the filter medium.

A spout 34 consisting of a tube open at both ends having an approximately ninety-degree bend at its upper end 35 and having a bore slightly less than the bore of the air line 14 has its lower end 36 slidably connected to the upper end 37 of the air line, by means of a telescopic connection. The slidable connection allows the spout 34 to be raised and lowered, thereby, in effect, increasing or decreasing the length of the air line 14.

The filtering system 10 is assembled for operation by inserting the above-sand filter cartridge 12 into the open end of the filter container 28. The lower end 36 of the spout 34 is inserted into the upper end 37 of the air line 14. The curved end 20 of the air line 14 is then telescopically connected to the open end 18 of the sub-sand tube 11 and rotated until the plane formed by the center points of the openings 19 lies substantially at right angles with the axis of the air line 14 when viewed in the direction of FIGURE 5.

Referring now especially to FIGURE 1 and FIGURE 3, the filtering system 10 is placed in the aquarium tank 38, the sub-sand tube 11 resting diagonally across the bottom 39 of the aquarium tank; the above-sand assembly 40, comprising the air inlet tube 15, filter cartridge 12, container 13, and spout 34, is placed in a vertical position in one corner of the aquarium tank 38, almost against the corner bracket 41 thereof. The above-sand assembly 40 is held vertically in place by means of the suction cup 27 affixed to the aquarium side wall 42 near its top edge. The sub-sand tube 11 is then so positioned that the plane formed by the openings 19 therein is parallel to the aquarium bottom 39.

A sand layer 44 of approximately two to three inches covers the sub-sand tube 11; the upper surface 45 of the sand preferably lies below the upper end of the container 13 so as to prevent any sand particles 44a from entering it. Water 43 lies above the sand layer 44, usually within one to two inches of the top of the aquarium tank 38. The spout 34 is slidably adjusted so that its upper end 35 lies just below or at the level of the water surface 43a. The air inlet tube 15 is connected to any conventional air pump (not shown) by a suitable flexible hose 46, and the filtering system 10 is ready for operation.

In operation, the air pump, having a usual operating pressure of about two pounds per square inch, is first allowed to pump air into the air line 14 via the air inlet tube 15 at a high pressure.

As the air is pumped into the air line 14, it, being lighter than water, rises in the air line. The pressure head forcing the aquarium water 43 into the air line 14 via the sub-sand tube, therefore, is much greater than the air pressure in the air leg in air line 14 and water 43 enters the air line 14, attempting to equalize the pressures. Therefore, it is seen that the filtered water enters the air line tube 14 and is recirculated into the aquarium tank 38. The rate of flow of water 43 in the air line 14 is governed by the air pressure and the distance between the point of air inlet 23 into air line 14 and the surface of the water 43a; the greater the air pressure, or the longer the air leg of air line 14, the greater the pressure differential forcing the water 43 into air line 14, and the greater the rate of flow.

It is found that by having an initially high air pressure, an interlocking of sand particles 44a occurs, within several seconds, around the openings 19 of the sub-sand tube 11 as is shown in FIGURE 7. It will be noted that the diameters of the openings 19 of the sub-sand tube 11 are two to three times larger than the diameters of the sand particles 44a, but because of the interlocking effect of the sand particles, sand particles cannot enter the sub-sand tube, except in the very first several seconds. Also, it should be noted that water 43 can still pass into the sub-sand tube 11 between the particles 44a. In other sub-sand filtering systems, tiny openings in the sub-sand device substantially the size or smaller than the size of sand particles are eventually clogged by individual sand particles, necessitating removal of the sub-sand device from the aquarium and a cleaning thereof. In the present sub-sand tube 11, however, an individual sand particle 44a cannot clog an opening therein, and cleaning of the tube is hardly ever necessary. If it should happen that an opening 19 becomes clogged by a number of sand particles 44a, the air pressure need only be raised for several seconds to momentarily break up the interlocking sand particles and cause a spaced interlocking as shown in FIGURE 5 to take its place. Thus, the sub-sand tube 11 is substantially self-cleaning in its action.

After the initial air pressure has been turned up for a few seconds to obtain the interlocking effect, the air pressure is reduced to an amount which is dependent upon the rate of recirculation of water 43 desired.

The positioning of the two longitudinal rows of openings 19 in the sub-sand tube 11 is such that the plane formed by the openings 19 is parallel to the bottom 39 of the aquarium tank 38. The water 43 in the aquarium tank 38 is thus drawn into these side openings 19 of the sub-sand tube 11 in a horizontally disposed direction varying from 0° to 90° with respect to the vertical. A much greater and more effective filtering action of sand is thus provided than if the openings were provided in the topmost portion of the tube because of the much greater surface area of sand 44 brought into contact with the water 43. For it is well known that water will take the least resistance offered to it and if the sub-sand openings 19 were provided either in the topmost portion of the tube or completely surrounding the tube, the water would drain only vertically downwards, thus contacting only a relatively small area of sand 44.

It is found that the pressure drop within the sub-sand tube 11, due to the friction of the water flow therein, can be described as a linear function of the distance away from the open end 18 of the sub-sand tube 11. This presupposes that the point of air inlet 23 in air line 14 is not more than a few inches from the open end 18 of the sub-sand tube 11. For this reason, the amount of the spacing of adjacent holes 19 from the open end 18 of the sub-sand tube 11 decreases linearly as the distance from the open end decreases. The linear function can be described as follows:

$$aS+D+b=0$$

where

S is the amount of spacing between adjacent holes 19.
D is the average axial distance of two adjacent holes 19 with respect to the open end 18 of the sub-sand tube 11.
a, b are constants whose value depends upon the air pressure, length of tube 11, number of holes 19 therein, the head of water 43, and any other factors affecting the rate of flow of water within the sub-sand tube 11 and the friction effects therein.

As a specific example, for a sand bed 44 two to three inches in depth, a depth of water 43 of six to eight inches, an air pressure of 0.5 p.s.i., a twelve-inch sub-sand tube 11, and two rows of a dozen holes 19 each spaced therein as described previously, the linear function relating the spacing and the distance of the holes from the open end 18 of the sub-sand tube is $$8S+D-11=0$$

Thus, as the friction increases along the tube 11, the spacing of the holes 19 decreases, providing, in effect, an increased area per section of tube into which the water 43 may be drawn. The increased water inlet area in one section of the tube 11 relative to another theoretically allows a greater amount of water 43 to be drawn into the tube relative to the other section but is offset by the greater friction effects encountered at that particular section of tube. Therefore, substantially the same amount of water 43 is drawn into the tube 11 at all sections, and the sub-sand tube 11 of the present invention overcomes the problem of a filtering action taking place only within that relatively small sand area closest to the siphoning point. If, for some reason, it would be advantageous to provide a side opening in the plane of the axis of the side openings 18, in the end 17, this could be done without altering any of the principles of the invention described herein.

If, for some reason, it is not necessary to utilize a sand bed 44 in a particular aquarium, the above sand assembly 40, comprising the air line 14, the air inlet line 15, the container 13, the filter cartridge 12, and the spout 34, can advantageously be used alone, that is, without the sub-sand tube 11. When only the above-sand assembly 40 is used, the lower end 20 of air line 14 is sealed and, of course, need not be curved.

It can thus readily be seen that the sub-sand tube 11 of the filtering system 10 permits the water 43 to be filtered angularly through the sand bed 44 rather than in a vertical direction, and also, it can be seen that the filtering action proceeds uniformly along the length of the tube 11, thus utilizing substantially the entire sand bed 44.

It is seen that in some instances the sub-sand tube 11 may be advantageously used alone, that is without the above-sand filter 12. In this case the sub-sand tube 11 is connected to a siphoning arrangement, one of the type previously described.

In most instances, however, the above-sand filter 12 is used in conjunction with the sub-sand tube 11. In these cases, while the water 43 is filtered through the sub-sand tube 11 as previously described, it is simultaneously filtered through an above-sand mechanical retaining filter medium, such as glass wool 31, contained within the filter cartridge 12. The above-sand filtering action commences as soon as the air pump begins to force air into the air line 14. The water 43 flowing through the glass wool filtering medium 31 contained within the filter cartridge 12 enters the air line 14 via the adjacent openings 30, 21 which are contained in the side wall of the container 13 and air line 14, respectively. The water 43 is then drawn upwardly along with, i.e., in parallel with, the water effluent of the sub-sand tube 11 to be redeposited into the aquarium tank 38 at or near the water surface 43a.

As the water 43 is filtered through the sand layer 44 and into the sub-sand tube 11, most of the particles of matter and sediment are mechanically retained by the sand. The amount of suspended matter in the water 43 is thus greatly diminished and the amount of the mechanical-retaining filter medium that need be placed above the sand 44 to insure a clarity and purity of the water 43 is very much decreased, being of the order of 0.5 cubic inch for glass wool 31. Other filtering systems, which do not incorporate a sand filtering action require a much greater amount of glass wool for proper filtering action, the amount being of the order of 10 to 20 cubic inches.

Since the necessity of having a large amount of sediment retaining above-sand filtering medium has been eliminated, the filter cartridge 12 which contains a filter medium such as glass wool 31, is very small in volume. It is constructed of an inexpensive material, such as a plastic, and is entirely disposable. The disposable feature of the above-sand filter cartridge 12 eliminates the need for removing the glass wool 31 or other filtering medium and for periodically cleaning out a larger filter box. As filtration proceeds, the glass wool 31 in the filter cartridge 12 becomes filled with sediment; when the sediment level appears above the level of the glass wool 31, the filter cartridge is easily replaced by inserting a fresh filter cartridge 12 into the container 13.

Filter cartridge 12 is also advantageously used as a medical dispensing vial. For instance, a desired amount of medicine is measured and incorporated in the form of a powder into the lower glass wool section of the filter cartridge 12. As the water 43 is drawn therethrough, the medicine is gradually dissolved therein and is circulated throughout the aquarium tank 38. As the level of the medicine decreases, an accurate measure of the amount of medicine dissolved by the water 43 is obtained.

As has been mentioned, the spout 34 is rotatably and slidably adjustable and is preferably positioned within the air line 14 so that its upper end 35 is just below or at the water level 43 in the aquarium tank 38. The opening in the upper end is directed away from the corner bracket 41 of the aquarium absolutely preventing any spattering of water 43 onto the corner bracket 41 or other metal pieces of the aquarium tank 38. The minutest pieces of metal, which could cause metal poisoning of the fish, are thus eliminated from the aquarium water 43.

The arrangement of the filtering system 10 is such that the air inlet tube 15 is connected into the air line 14 below the surface 45 of the sand layer 44, thus permitting a long air line and a high rate of recirculation of water 43 if desired. The conventional filter box is usually clamped on the upper edges of the aquarium; however, the filter box is not deep, and the air line is consequently much shorter than in the present invention.

The arrangement of the filtering system 10 is such that it can be essentially completely hidden from sight. The above-sand assembly 40 comprising, as it does, three elongated cylindrical tubes parallel to, and affixed to one other, takes up very little space and can be hidden from view in one corner of the aquarium tank 38, as previously described; the sub-sand tube 11, located below the sand bed 44, cannot be seen.

It is found that the filtering system 10, herein described, effectively decomposes and renders harmless food particles, fish excretions, and other foreign matter before they can decompose into gases which becloud the water 43 and cause objectionable odors. Since the fish excretions, food particles and other foreign matter are the only source of these objectionable gases, their decomposition into harmless non-gas producing particles completely obviates the need of a gas-absorbing filter medium, such as charcoal.

The foregoing description of one embodiment of the invention is not to be considered in any way as a limitation upon the scope of the invention. The scope of the invention is defined only by the following claims.

I claim:

1. A water filtering device, for use in an aquarium tank having a sand bed on the floor thereof, comprising: an elongated perforated hollow member, having a first and a second end adapted to be positioned beneath said sand bed and adapted to lie substantially horizontal therein; siphoning means connected to said second end of said hollow member; and a sediment-retaining filter having an outlet end connected to said siphoning means, said filter member being adapted to be stably positioned in said aquarium tank above said sand bed whereby to collect suspended matter in the water of said aquarium tank through an inlet end of said filter member in communication with the water of said aquarium tank, said filter member and said perforated hollow member being connected to said siphoning means in parallel, said siphoning means being adapted to recirculate the water effluent siphoned from said perforated hollow member and from said sediment-retaining filter member into the water section of said aquarium tank.

2. A water filtering device, for use in an aquarium tank having a sand bed on the floor thereof, comprising: an elongated perforated hollow member, having a first and a second end, adapted to be positioned beneath said sand bed and adapted to lie substantially horizontal therein, said perforations being spaced increasingly further apart in proportion to the distance of said perforations from the said first end; siphoning means connected to the said second end of said tube; and a disposable filter cartridge having an outlet end connected to said siphoning means, said filter cartridge being stably positioned in said aquarium tank and having an inlet end above said sand bed whereby to collect suspended matter from the water of said aquarium tank, said filter cartridge and said perforated hollow member being connected to said siphoning means in parallel, said siphoning means being adapted to recirculate the water effluent siphoned from both said perforated member and said filter cartridge into the upper section of said aquarium tank.

3. An aquarium water filtering system comprising: a sand bed comprising sand particles of an average mesh size an elongated tube sealed at one end and adapted to be positioned beneath said sand bed to lie substantially horizontally therein and provided only with two longitudinal diametrically-opposed rows of transversely aligned openings in the wall of said tube, the spaced between adjacent openings in each row decreasing linearly from the end remote from said sealed end of said tube in accordance with the formula $aS+D+b=0$, said openings each having a diameter larger than the average mesh size of said sand particles of said sand bed; siphoning means connected to the end of said tube remote from said sealed end; a disposable filter cartridge having an outlet end connected to said siphoning means; a filter medium retained within said filter cartridge, said filter cartridge being stably positioned in said aquarium tank above said sand bed and having an inlet end whereby to collect suspended matter from the water of said aquarium tank, said filter cartridge and said tube being connected to said siphoning means in parallel, said siphoning means being adapted to recirculate the water effluent from both said sub-sand tube and said above-sand member into the water layer of the aquarium.

4. A water filtering system, for use in an aquarium tank having a sand bed on the floor thereof, comprising: an elongated cylindrical tube formed with longitudinally extending rows of perforations and adapted to be positioned beneath said sand bed to lie substantially horizontally therein the perforations of said perforated tube being spaced increasingly further apart as the distance of said perforations from one end increases; an elongated air line, one end of which is connected to the other end of said perforated tube, the other end of the air line adapted to be disposed near the top of the aquarium tank; a removable above sand filter cartridge containing a sediment-retaining filter medium connected into said air line, said filter cartridge adapted to be stably positioned in the water section of the aquarium tank and in direct communication with the water section, said filter cartridge and said perforated tube being connected to said air line in parallel; means for introducing air into said air line to cause a siphoning action to take place whereby water is drawn through said above sand filter cartridge and said perforated tube simultaneously and into said air line and is recirculated into the water section of the aquarium tank; and means for maintaining said tube in a position wherein an imperforate longitudinally extending wall section of said tube faces upwardly.

5. A water filtering device for use in an aquarium tank comprising: an elongated substantially vertical air line, the lower end of which is sealed, the upper end of which is open and adapted to be disposed near the top of the aquarium tank; a cylindrical container closed at its lower end and open at the other, a portion of the said wall of which is longitudinally affixed to a portion of the side wall of said air line; means defining adjacent transversely aligned openings in said side walls of said air line and said container near the lower end of said air line; a cylindrical filter cartridge removably mounted, in substantially airtight fashion, in said open upper end of said cylindrical container; a filtering medium contained within said filter cartridge; means defining a second opening in the side wall of said air line and above said means defining adjacent transversely aligned openings; and an air inlet line, one end of which is affixed in an airtight manner to said second opening in said air line, the other end of which is connected to an air pump to admit air into said air inlet line.

6. A water filtering system, for use in an aquarium tank having a sand bed on the floor thereof, comprising: an elongated cylindrical tube sealed at one end and adapted to be positioned within said sand bed to lie substantially horizontally therein; an elongated tubular air line, one end of which is slidably and rotatably connected to the end of said tube remote from said sealed end and the other end of which is open, and adapted to be disposed near the top of the aquarium tank, said air line also adapted to be substantially vertically disposed along the side wall of the aquarium tank; a container, the side wall of which is longitudinally affixed to the lower section of the side wall of said air line and which is closed at its lower end and open at the other; means defining adjacent aligned openings in said side walls of said air line and said container near the lower end of said air line; a filter cartridge removably connected in substantially airtight fashion to said open upper end of said container; a filter medium retained within said filter cartridge; an air inlet tube leading into and affixed to the lower portion of said air line, said inlet line having connected thereto an air pump whereby to cause air to enter said air line and draw water effluent simultaneously from said tube and said filter cartridge to be recirculated near the top of the aquarium tank.

7. A water filtering system, for use in an aquarium tank having a sand bed on the horizontal floor thereof, comprising: an elongated cylindrical tube sealed at one end and adapted to be positioned beneath said sand bed to lie substantially horizontally therein and provided only with two longitudinal diametrically-opposed rows of aligned openings in the side wall of said tube, the space between adjacent openings in each row decreasing linearly from the end remote from said sealed end of said tube in accordance with the formula $aS+D+b=0$, an elongated tubular air line, one end of which is slidably and rotatably connected to the end of said tube remote from said sealed end and the other end of which is open and is adapted to be disposed near the top of said aquarium tank, said air line also being adapted to be substantially vertically disposed along the side wall of the aquarium tank; holding means to retain said air line in said vertical position; a spout having a curved upper end, and a lower end rotatably and slidably adjustable within said open upper end of said air line; a cylindrical container, a portion of the side wall of which is longitudinally affixed to a portion of the side wall of said air line and which is closed at its lower end and open at the other; means defining adjacent aligned openings in said side walls of said air line and said container near the lower end of said air line; a cylindrical filter cartridge removably mounted, in substantially airtight fashion, within said open upper end of said cylindrical container; a column of glass wool provided within said filter cartridge; a medicinal material incorporated into said glass wool; a pair of screens, one at each end of said column of glass wool retaining said glass wool within said filter cartridge; means defining a second opening in said lower side wall of said air line; and an air inlet line, one end of which is affixed in an airtight manner to said second opening in said air line, the other end of which is connected to means for introducing air into said air inlet line.

8. A water filtering device for use in an aquarium tank comprising: an elongated substantially vertical air line connected to a filtering member, the upper end of said air line being open and adapted to be disposed near the top of the aquarium tank; holding means affixed to said air line and having an outlet communicating therewith; a filter cartridge removably mounted in said holding means, said filter cartridge containing a filter medium exposed to water in said tank; means defining an opening near the lower end of the side wall of said air line; and an air inlet line, one end of which is affixed in an airtight manner to said opening near the lower end of the side wall of said air line, the other end of which is connected to an air pump to admit air into said air inlet line to draw filtered water into said air line, in parallel from both said filtering member and holding means outlet.

9. A water filtering device for use in an aquarium tank comprising: an elongated substantially vertical air line connected to a filtering member, the upper end of which is open and adapted to be disposed near the top of the aquarium tank; holding means affixed to said air line and having an outlet communicating therewith; a filter cartridge removably mounted in said holding means, said filter cartridge containing a filter medium and medicinal material exposed to water in said tank; means defining a second opening near the lower end of the side wall of said air line; and an air inlet line, one end of which is affixed in an airtight manner to said second opening in said air line, the other end of which is connected to an air pump to admit air into said air inlet line to draw filtered water into said air line in parallel, from both said filtering member and from said holding means outlet.

References Cited in the file of this patent

UNITED STATES PATENTS

| | | |
|---|---|---|
| 417,405 | Coffey | Dec. 17, 1889 |
| 460,352 | Reading | Sept. 29, 1891 |
| 699,032 | Smith | Apr. 29, 1902 |
| 880,783 | Erlwein | Mar. 3, 1908 |
| 1,747,804 | Traverse | Feb. 18, 1930 |
| 2,014,945 | Mayer | Sept. 17, 1935 |
| 2,204,093 | Mallory | June 11, 1940 |
| 2,536,196 | MacLeod | Jan. 2, 1951 |
| 2,595,965 | Ludwick | May 6, 1952 |
| 2,674,574 | Pettas | Apr. 6, 1954 |
| 2,676,921 | Vansteenkiste | Apr. 27, 1954 |
| 2,715,609 | Hansen | Aug. 16, 1955 |
| 2,730,496 | Zavod | Jan. 10, 1956 |
| 2,770,366 | Puzarowski | Nov. 13, 1956 |
| 2,782,161 | Willinger et al. | Feb. 19, 1957 |

FOREIGN PATENTS

| | | |
|---|---|---|
| 644,693 | Great Britain | Oct. 18, 1950 |
| 823,068 | Germany | Nov. 29, 1951 |

UNITED STATES PATENT OFFICE
CERTIFICATE OF CORRECTION

Patent No. 3,035,702                                    May 22, 1962

James H. Marvin

It is hereby certified that error appears in the above numbered patent requiring correction and that the said Letters Patent should read as corrected below.

Column 8, line 60, for "said wall" read -- side wall --.

Signed and sealed this 9th day of October 1962.

(SEAL)
Attest:

ERNEST W. SWIDER
Attesting Officer

DAVID L. LADD
Commissioner of Patents